April 14, 1936.   T. C. MANNING   2,037,081
GRAIN WASHER AND DRIER
Filed March 19, 1934   2 Sheets-Sheet 1

INVENTOR
Timothy C. Manning
BY
Hovey & Hamilton,
ATTORNEYS.

April 14, 1936.   T. C. MANNING   2,037,081
GRAIN WASHER AND DRIER
Filed March 19, 1934   2 Sheets-Sheet 2

INVENTOR,
Timothy C. Manning.
BY
Hovey & Hamilton,
ATTORNEYS.

Patented Apr. 14, 1936

2,037,081

UNITED STATES PATENT OFFICE 2,037,081

GRAIN WASHER AND DRIER

Timothy C. Manning, North Kansas City, Mo.

Application March 19, 1934, Serial No. 716,345

3 Claims. (Cl. 83—28)

This invention relates to machines for handling and treating grain and especially smutty or dirty grain that must be washed and dried before storage, and the primary object of the invention is to provide such equipment having the capacity of washing and drying a large quantity of grain in the shortest possible length of time.

One of the important aims of the present invention is the provision of a grain washer and drier that has means for quickly introducing a quantity of water to the grain being treated immediately upon its introduction into the machine and then removing at least a part of said water with its collected foreign matter before the grain has been moved an appreciable distance through the machine, and especially before a second supply of water is sprayed upon the grain to serve as a final wash which completely purges the bulk of the grain of all smut and impurities.

Another object of the invention is to provide a machine of the aforementioned character wherein the speed with which the first water is expelled from the machine may be controlled and also wherein the quantity of secondary wash water may be governed to suit conditions and requirements of the grain being handled.

A yet further aim of this invention is the contemplation of a machine wherein is embodied a large number of grain-moving blades, which blades are arranged in spiral fashion and relatively close together, whereby the grain is moistened and dried speedily enough to permit the machine to be used continuously.

With the aforementioned broad general objects in mind, the invention will be described by reference to the accompanying drawings, wherein.

Figure 1:
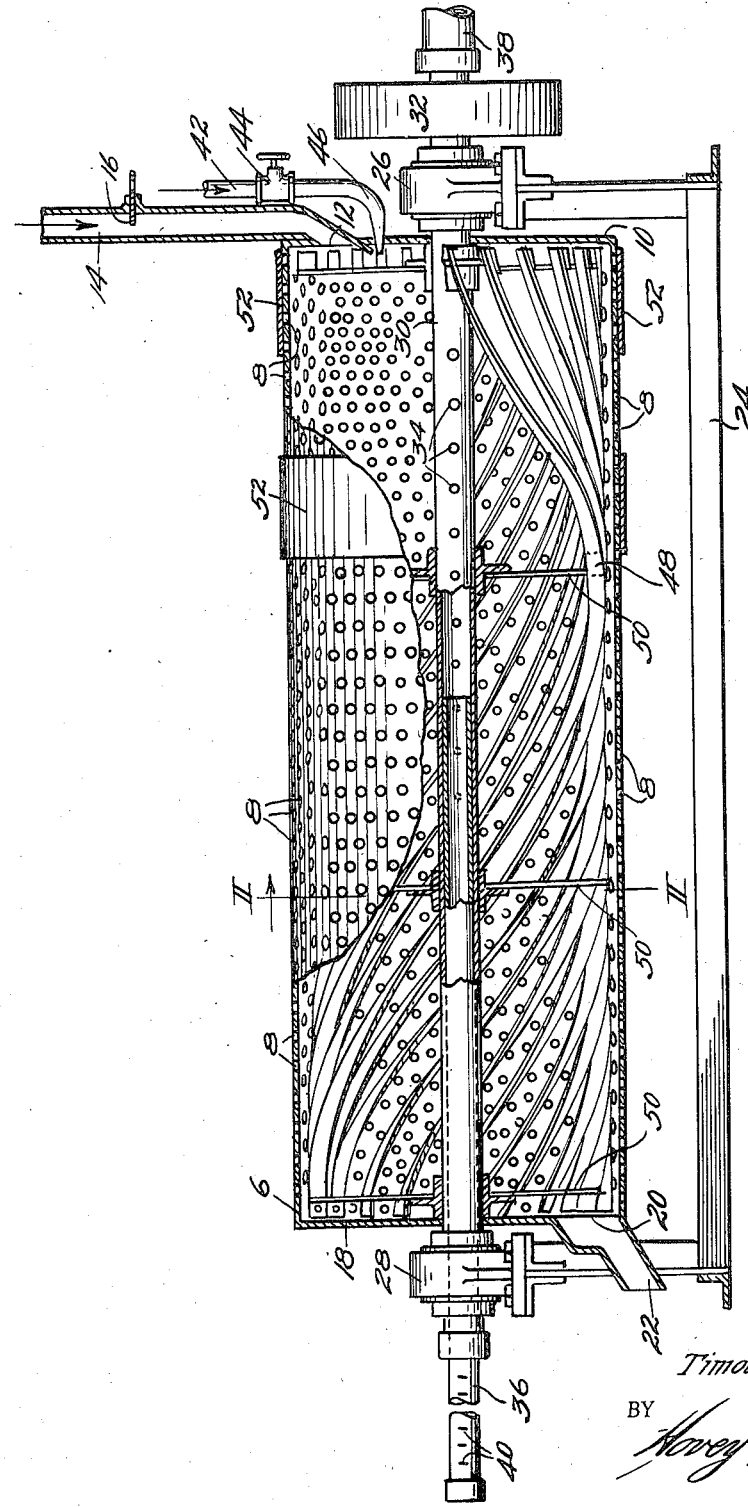
Figure 1 is a longitudinal, vertical section through a grain washer and drier made to embody the present invention.
Figure 2:
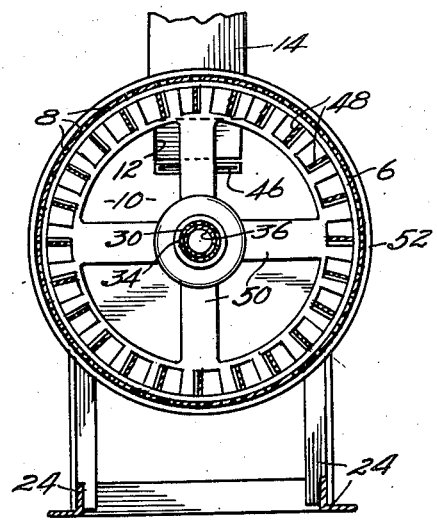
Fig. 2 is a vertical cross section through the machine taken on line II—II of Fig. 1.
Figure 3:
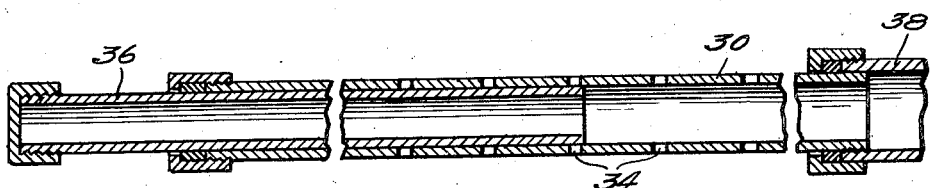
Fig. 3 is an enlarged, fragmentary, longitudinal section through the hollow shaft of the machine.

In treating smutty wheat it is oftentimes desired to first flush the grain with a heavy charge of water immediately upon its introduction into the washer. This action immediately disposes of a large portion of the foreign matter, after which the grain may be thoroughly cleansed by washing with another supply of water which need not be of such great volume as that supply first mentioned.

The machine herein described is susceptible of such an accomplishment and should comprise a stationary drum 6 having its side perforated as at 8 and its one end 10 provided with an intake port 12 that is in communication with a delivery chute 14 having a delivery control slide 16 therein. The other end 18 of drum 6 has an outlet port 20 formed therein near the bottom of drum 6 and a spout 22 extends this outlet port 20 to a point beyond the supporting framework 24 which carries all the parts of this washer and drier. Bearings 26 and 28 disposed adjacent ends 10 and 18 respectively rotatably carry hollow shaft 30 which extends longitudinally and axially through perforated drum 6.

As shown in Fig. 1, shaft 30 projects through both bearings 26 and 28 which journal the same and a drive pulley 32 is mounted upon one projected end to serve as a medium of applying power to rotate said shaft 30 at a high rate of speed. Shaft 30 has a plurality of openings 34 formed through the wall thereof and these openings progressively decrease in size as the center of drum 6 is approached. It is important that there be no openings along a length of shaft 30 near the discharge end of the drum for in this zone the wheat or grain is being freed of all moisture preparatory to storing the same.

It is oftentimes desirable to vary the amount of water which is introduced to the wheat within drum 6 and through openings 34. A unique method of controlling this water supply is built into the machine and is in the form of a core 36 that is in tight telescoping engagement with shaft 30 and extends thereinto from one end as a water supply pipe 38 is connected to the opposite end thereof. Core 36 may be graduated as at 40 to indicate the number of openings 34 that are rendered inoperative and moving the core longitudinally back and forth will alter the effective number of holes 34. A water supply pipe 42 having a control valve 44 therein supplies water to the grain immediately upon its introduction through inlet port 12 by way of nozzle 46, which is relatively wide and commensurate in width with port 12. This nozzle 46 supplies a relatively great quantity of water to the grain as it falls into drum 6. At this point the major part of foreign matter is washed from the wheat and the fast rotation of the hereinafter described blades quickly expels this water from drum 6 through perforations 8.

Shaft 30 carries a large number of spirally disposed blades 48. These blades are spaced apart a distance substantially equal to their width and are formed so that turning shaft 30 will not only carry the wheat around the axis of drum 6, but will move it longitudinally therealong toward outlet port 20. These blades 48 are connected to shaft 30 by a number of spiders or similar members 50 and the frame-like form of this rotating group of elements, including blades 48, permits quick expulsion of water by centrifugal force. The water merely flows from drum 6 through the perforations and may be drained off from beneath the machine in any manner found desirable.

Since the greatest volume of water introduced to the wheat is at one end of drum 6, and further since it is desirable to control the length of time said volume of water is acting upon the wheat, it becomes a desirable feature of this invention to provide means for adjusting the number of effective perforations 8 which present themselves along drum 6 at that end.

The means for controlling the number of effective perforations 8 is clearly shown in Fig. 1 and comprises a number of adjustable bands 52, all of which are slidable longitudinally along the outer face of drum 6. These bands 52 are of a substantial width and snugly fit the annular outer face of the stationary drum so that they will preclude the passage of water through any of the perforations 8 that might underlie them.

Figure 4:
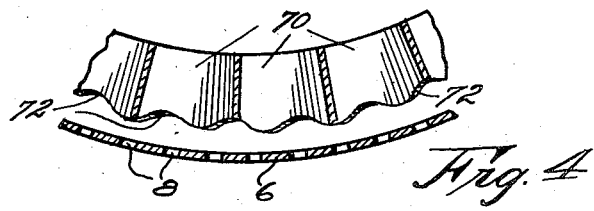
Fig. 4 is a fragmentary, sectional view through the lower portion of the perforated drum and a number of the blades therein, showing said blades made in accordance with a modified form of the invention, and, Fig. 5 is another fragmentary, detailed view of the undulated form of blade that may be used in the machine.
Figure 5:
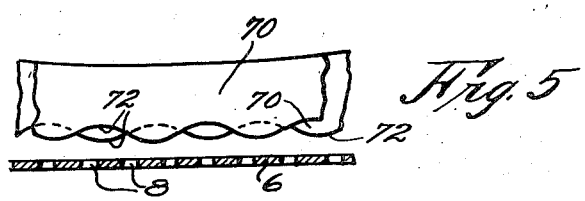

In Figs. 4 and 5 is shown a modified manner of making the spiral blades. In this instance blades 70 have their free edges undulated as at 72 so that in passing through the grain it is "worked" into ridges that are constantly changed as the series of blades are rotated. The undulations of adjacent blades may be formed as illustrated in Fig. 5 so that their high points are in staggered relation. Thus a maximum amount of ridging and working is set up and the normal conveying and agitating is supplemented to a marked advantageous degree.

It has been found that in using such a washing and drying machine that a continuous flow of grain can be maintained and that it will be thoroughly washed and dried between the time it enters inlet port 12 and the time it is expelled through spout 22.

Having thus described the invention, what is claimed as new and desired to be secured by Letters Patent is:

1. In a grain treating machine of the kind described, a stationary perforated, horizontal drum having an inlet port and an outlet port formed through the walls thereof; a hollow rotatable shaft extending longitudinally through said drum; a series of spirally disposed blades carried by the said shaft for moving the grain toward the outlet port; a plurality of spaced-apart openings formed through the wall of said hollow shaft along the length thereof on one side of the transverse medial center of the drum; and means to supply water to said shaft as the same is being rotated, said openings gradually decreasing in size as the center of the drum is approached, all the water introduced to the drum being removed therefrom through said perforations of the drum.

2. In a grain treating machine of the kind described, a horizontal drum through which passes the grain being treated; rotatable means within the drum for moving the grain therethrough including a hollow shaft; means for supplying water to one end of said shaft; a plurality of graduated holes formed through the shaft; and a core fitted into said hollow shaft and movable longitudinally therealong for selectively closing a certain predetermined number or all of said holes.

3. A grain washer and drier comprising in combination, a stationary, perforated drum having its axis disposed horizontally, a grain inlet port formed in one end above the axis and a grain outlet port formed in the other end below the said axis; a water supply pipe terminating within the drum to direct water into the stream of grain as it passes through the inlet port; a rotatable hollow shaft journalled at the ends of said drum and extending axially therethrough; a series of holes formed through the wall of said shaft within the drum along a portion of its length extending inwardly from the end of the drum forming the said inlet port, said holes gradually decreasing in diameter as the transverse center of the drum is approached; spiral blades mounted on the shaft, formed to move the grain longitudinally along the drum toward the outlet port and to expel water through the perforations of the drum to the atmosphere; a pipe extending into the shaft for selectively closing a predetermined number of the holes whereby to govern the flow of water into the drum; and a longitudinally adjustable band circumscribing the drum for selectively closing a predetermined number of the holes in said drum to govern the escape of water from the drum to the atmosphere through said holes whereby grain may be continuously passed through said washer and drier and washed with greater or lesser amounts of water that continuously flows to and from the drum immediately prior to drying by centrifugal action and expulsion from the said drum through the outlet port thereof.

TIMOTHY C. MANNING.